United States Patent [19]
Yahiro et al.

[11] Patent Number: 5,741,866
[45] Date of Patent: Apr. 21, 1998

[54] METHOD FOR PRODUCING AN ACETAL COPOLYMER

[75] Inventors: Shyuzi Yahiro, Yamamoto; Minoru Yamamoto, Kurashiki, both of Japan

[73] Assignee: Asahi Kasei Kogo Kabushiki Kaisha, Osaka, Japan

[21] Appl. No.: 646,238

[22] PCT Filed: Feb. 28, 1995

[86] PCT No.: PCT/JP95/00306

§ 371 Date: May 6, 1996

§ 102(e) Date: May 6, 1996

[87] PCT Pub. No.: WO95/23171

PCT Pub. Date: Aug. 31, 1995

[30] Foreign Application Priority Data

Feb. 28, 1994 [JP] Japan .................................. 6-052576

[51] Int. Cl.$^6$ .................................................. C08G 63/91
[52] U.S. Cl. ........................... 525/414; 528/408; 528/417
[58] Field of Search .................... 525/414; 528/408, 528/417

[56] References Cited

U.S. PATENT DOCUMENTS 4,758,608   7/1988   Collins et al. ............................. 522/43

FOREIGN PATENT DOCUMENTS

| 0128739 A1 | 12/1984 | European Pat. Off. . |
| 0129369 A1 | 12/1986 | European Pat. Off. . |
| 62-13369 | 3/1987 | Japan . |
| 62-13973 | 3/1987 | Japan . |
| 3-63965 | 10/1991 | Japan . |

OTHER PUBLICATIONS

Schenck, et al. "Mit Benzophenon Photosensibilisierte Autoxydation Von Sek.Alkoholen Und Athern. Darstellung Von α-Hydroperoxyden" Chem. Bar., 96: 509–513 (1963) No Translation.

Ikeda, et al. "Autoxidation of 2-Alkenyldioxolanes and 2-Alkenyl-1,3-Dioxanes" J. Org. Chem., 29: 286–288 (1964).

Seyfarth, et al. "Reaktionen Von 2-Halogenmethyl-1,3-Dioxolanen Mit Molekularem Sauerstoff, Auslosung Einer Neuartigen Umlagerung" Chem. Ber., 101: 623 (1968) No Translation.

Hermann, et al. "Uber Den Einfluβ Von Reglern Auf Die Polymerisation Des Trioxans" Macromol Chem., 90: 1, 6 (1966) No Translation.

*Primary Examiner*—Melvyn I. Marquis
*Attorney, Agent, or Firm*—Pennie & Edmonds LLP

[57] ABSTRACT

Disclosed is a method for producing an acetal copolymer, which comprises copolymerizing trioxane with a cyclic ether in the presence of a cation-active catalyst, wherein the cyclic ether is obtained by adding to a fresh cyclic ether containing a peroxide derived therefrom in an amount of 15 ppm by weight or less in terms of hydrogen peroxide at least one sterically hindered phenol in an amount of from 10 to 500 ppm by weight, based on the weight of said fresh cyclic ether. By the method of the present invention, it has become possible not only to stably and efficiently produce an acetal copolymer having high thermal stability, but also to stably conduct a post-treatment of the obtained acetal copolymer for deactivating the remaining catalyst and changing the unstable terminals to stable terminals, so that an ultimate acetal copolymer having high thermal stability can be stably obtained.

5 Claims, No Drawings

5,741,866

1

METHOD FOR PRODUCING AN ACETAL COPOLYMER

TECHNICAL FIELD

The present invention relates to a method for producing an acetal copolymer. More particularly, the present invention is concerned with a method for producing an acetal copolymer, which comprises copolymerizing trioxane with a cyclic ether which is copolymerizable therewith, wherein the cyclic ether is one which is obtained by adding to a fresh cyclic ether containing a peroxide derived therefrom in an amount of 15 ppm by weight or less in terms of hydrogen peroxide at least one sterically hindered phenol in an amount of from 10 to 500 ppm by weight, based on the weight of the fresh cyclic ether. By the method of the present invention, an acetal copolymer having high thermal stability can be stably obtained.

BACKGROUND ART

Methods for producing acetal copolymers by copolymerizing formaldehyde or a cyclic oligomer thereof, such as trioxane or tetraoxane, with a cyclic ether copolymerizable therewith have conventionally been known, and widely used on a commercial scale. However, the acetal copolymers obtained by conventional methods have an unsatisfactory thermal stability.

A factor causing a lowering of the thermal stability of acetal copolymers consists in decomposition of the acetal copolymers by oxidation.

In the course of the production of an acetal copolymer, oxidative decomposition of the acetal copolymer is likely to occur during the polymerization reaction of monomers and post-treatments of the obtained copolymer, such as removal of unreacted monomers, washing and drying of the obtained acetal copolymer. Examined Japanese Patent Application Publication No. 3-63965 (corresponding to EP 0128739 A1) discloses a method for producing an acetal copolymer, in which, for the purpose of preventing a lowering of the polymerization yield, a sterically hindered phenol is added to a monomer prior to the initiation of the polymerization reaction, in order to suppress not only the decomposition position of the main chain of the acetal copolymer during the polymerization reaction but also the oxidative decomposition of the acetal copolymer during the post-treatments. However, the thermal stability of the acetal copolymer obtained by the above-mentioned method is still unsatisfactory.

SUMMARY OF THE INVENTION

In these situations, the present inventors have made extensive and intensive studies with a view toward finding a cause for the oxidative decomposition of the acetal copolymer, which decomposition gives rise to a lowering of the thermal stability of the acetal copolymer. As a result, it has unexpectedly been found that, a peroxide, which is derived from a cyclic ether (hereinafter, frequently referred to simply as "derived peroxide"), (the derived peroxide is thus caused to be present in the cyclic ether to be used as a comonomer for producing an acetal copolymer though it is in a relatively small amount) largely influences the oxidative decomposition of the acetal copolymer. The amount of derived peroxide present in the cyclic ether increases during the storing of the cyclic ether, and when a cyclic ether, the derived peroxide content of which has exceeded a certain critical level, is used as a comonomer for copolymerization

2 with trioxane, the thermal stability of the resultant acetal copolymers becomes extremely low.

In the copolymerization reaction of trioxane with a cyclic ether, the trioxane as a main monomer, which is originally liquid, undergoes phase change (phase transition) to a solid through a viscous liquid by the addition of a cation-active catalyst, while the copolymerization reaction advances. The period from the addition of the catalyst to the solidification of the liquid monomer is called a "polymerization induction period". As a result of further studies of the present inventors, it has also been unexpectedly found that, when a cyclic ether containing a derived peroxide in an amount exceeding a certain critical level is used, the polymerization induction period becomes extremely long, so that a continuous operation of copolymerization for producing an acetal copolymer becomes difficult.

On the other hand, in the method of the above-mentioned Examined Japanese Patent Application Publication No. 3-63965 (which discloses addition of a sterically hindered phenol), any notice was not given to a derived peroxide present in a cyclic ether, which has been found for the first time by the present inventors to be an essential cause of the oxidative decomposition of the acetal copolymer. In this prior art method, a sterically hindered phenol is added to trioxane prior to the initiation of the copolymerization reaction. Generally, in the methods of producing acetal copolymers on a commercial scale, a cyclic ether to be used is synthesized and purified in a substantial amount and stored for a certain period of time before use. Therefore, it is highly possible that the cyclic ether should already contain a large amount of a derived peroxide before the sterically hindered phenol is added to the cyclic ether. As described below in detail, when a cyclic ether already containing a derived peroxide in an amount exceeding 15 ppm by weight is used, the acetal copolymer obtained is inevitably caused to have a low thermal stability even if a sterically hindered phenol is added to the cyclic ether prior to the initiation of the copolymerization reaction. Therefore, it is difficult to effectively prevent the oxidative decomposition of an acetal copolymer by the method disclosed in Examined Japanese Patent Application Publication No. 3-63965, and the thermal stability of the acetal copolymer obtained by this method is unsatisfactory.

As mentioned above, in the production of acetal copolymers by copolymerizing trioxane with a cyclic ether copolymerizable therewith, when a cyclic ether containing a peroxide derived from the cyclic ether in an amount exceeding a certain critical level is used, not only does the resultant acetal copolymer have a low thermal stability, but also a continuous operation for producing an acetal copolymer becomes difficult. The present inventors made extensive and intensive studies with a view toward finding a critical upper limit of the amount of a derived peroxide in a cyclic ether, such that the above-mentioned problems can be obviated. As a result, it has been found that the critical upper limit is 15 ppm by weight in terms of hydrogen peroxide (hereinafter, the expression "in terms of hydrogen peroxide" is frequently omitted).

A cyclic ether is susceptive to autoxidation at room temperature. By autoxidation, a cyclic ether is converted into a peroxide having a peroxide group represented by the formula —OOR wherein R represents a hydrogen atom or an alkyl group, each derived from the cyclic ether [see, for example, G. O. Schenck, H. D. Becker, K. H. Schulte-Elte, C. H. Krauch, Chem. Ber., 96, 509 (1963); C. K. Ikeda, R. A. Braun., B. E. Soreson, J. Org. Chem., 29, 286 (1964); and H. E. Seyfarth, A. Hesse, A. Rieche, Chem. Ber., 101, 623

(1968)]. Therefore, by storing a synthesized and purified cyclic ether, the cyclic ether is caused to contain a large amount of a derived peroxide.

As a method for reducing the content of a derived peroxide in a cyclic ether containing a large amount of a derived peroxide, a method using distillation is conceivable. However, the method using distillation has problems in that not only is a complicated distillation apparatus needed, but also the derived peroxide suffers decomposition during the distillation to form radicals, which rather cause an increase in the derived peroxide content.

Thus, for suppressing the derived peroxide content of a cyclic ether to a level which is not larger than 15 ppm by weight in terms of hydrogen peroxide, it is necessary that some measure for preventing an increase in the derived peroxide content of a cyclic ether be taken at the time the derived peroxide content of a synthesized and purified cyclic ether is still at a low level which is not larger than 15 ppm by weight.

As a conventional method for suppressing the increase in the content of a derived peroxide in a cyclic ether, there can be mentioned a method in which an amine compound known as an antioxidant for ether compounds is added to the cyclic ether, so as to suppress the increase in the derived peroxide content. However, in this method, a serious problem is likely to occur such that neutralization occurs between a polymerization catalyst and the amine compound as an antioxidant so that the copolymerization reaction cannot proceed.

In these situations, the present inventors have made extensive and intensive studies toward developing a method for producing an acetal copolymer, which is not only advantageous for suppressing the increase in the content of a derived peroxide in a cyclic ether, but also is free from a problem such that an antioxidant, which is employed to suppress the increase in the derived peroxide content, lowers the activity of a polymerization catalyst. As a result, the present inventors have found that when a sterically hindered phenol is added in a specific amount to a fresh cyclic ether containing a peroxide derived therefrom in still a limited amount, i.e., 15 ppm by weight or less in terms of hydrogen peroxide (such a cyclic ether can be one which has been just synthesized and purified), not only can the increase in the content of the derived peroxide contained in the cyclic ether be suppressed, but also the copolymerization reaction can proceed efficiently. That is, the present inventors have found that by adding to a cyclic ether containing a derived peroxide in an amount of 15 ppm by weight or less, a sterically hindered phenol in an amount of 10 to 500 ppm by weight, based on the cyclic ether, the content of the derived peroxide contained in the cyclic ether is not substantially increased any further, and that when a copolymerization of trioxane with the above-mentioned cyclic ether having the sterically hindered phenol in such specific amount as mentioned above is conducted, not only can the copolymerization proceed without suffering a lowering of the activity of a cation-active catalyst, but also it becomes possible to produce an acetal copolymer having high thermal stability.

The present invention has been completed based on these findings.

Therefore, it is an object of the present invention to provide a novel method for producing an acetal copolymer, comprising copolymerizing trioxane with a cyclic ether copolymerizable with the trioxane, by which an acetal copolymer having high thermal stability can be stably obtained.

The forgoing and other objects, features and advantages of the present invention will be apparent to those skilled in the art from the following detailed description and appended claims.

DETAILED DESCRIPTION OF THE INVENTION

According to the present invention, there is provided a method for producing an acetal copolymer, which comprises copolymerizing trioxane with a cyclic ether in the presence of a cation-active catalyst, wherein the cyclic ether is one which is obtained by adding to a fresh cyclic ether containing a peroxide derived therefrom in an amount of 15 ppm by weight or less in terms of hydrogen peroxide at least one sterically hindered phenol in an amount of from 10 to 500 ppm by weight, based on the weight of the fresh cyclic ether.

The method of the present invention will be described below in detail.

In general, in methods for producing an acetal copolymer including the method of the present invention in which trioxane is copolymerized with a cyclic ether copolymerizable therewith, the cyclic ether as a comonomer is used in an amount of 10 mol % or less, based on the trioxane as a main monomer. That is, the amount of a cyclic ether employed is small, as compared to the amount of trioxane employed. Therefore, with respect to the supply of a cyclic ether, from the viewpoint of ease in operation, a method in which a cyclic ether is produced in batches in a substantial amount and then purified and stored, and a desired amount of it is fed to a polymerization apparatus, is preferred over a method in which a cyclic ether is continuously produced and purified, and fed to a polymerization apparatus. However, in the former, which is generally a preferred method, during the storage of the cyclic ether, the amount of a peroxide derived from the cyclic ether is gradually increased. When a cyclic ether containing more than 15 ppm by weight of a peroxide derived from the cyclic ether is used for producing an acetal copolymer, the obtained acetal copolymer has a poor thermal stability because the acetal copolymer suffers oxidation decomposition due to the derived peroxide. Even when the amount of a derived peroxide contained in a cyclic ether used is very small, if the cyclic ether contains a derived peroxide in an amount of more than a critical upper limit amount, i.e., 15 ppm by weight, the thermal stability of the obtained acetal copolymer is adversely affected to a large extent. The amount of a derived peroxide can be determined, in terms of hydrogen peroxide, by the sodium thiosulfate titration method described below, which is a method generally employed for the analysis of a peroxide group —(O—O)—.

As mentioned above, when an amine, which is a customary antioxidant for ether compounds, is used for suppressing an increase in the amount of a derived peroxide during the storage of a cyclic ether, a serious problem arises that the amine deactivates the polymerization catalyst. As described above, the present inventors researched various antioxidants for a cyclic ether, and as a result, they have found that when a sterically hindered phenol is added to a cyclic ether in an amount of 10 to 500 ppm by weight within a limited period of time after the synthesis and purification of the cyclic ether, i.e., within the time period at which the derived peroxide content of the cyclic ether does not yet exceed 15 ppm by weight, an increase in the amount of the derived peroxide during the storage of the cyclic ether can be suppressed, and also found that the adverse effect of the added sterically hindered phenol on the copolymerization of trioxane with the cyclic ether is small.

In the present invention, a cyclic ether is employed which is obtained by adding to a synthesized and purified fresh cyclic ether a sterically hindered phenol in an amount of 10 to 500 ppm by weight, based on the fresh cyclic ether. When the amount of the sterically hindered phenol added is less than 10 ppm by weight, the amount of the derived peroxide is increased during the storage of the cyclic ether. On the other hand, when the amount of the sterically hindered phenol added is more than 500 ppm by weight, the activity of the polymerization catalyst is lowered, so that the polymerization yield becomes low.

In the present invention, a cyclic ether to be copolymerized with trioxane must contain a sterically hindered phenol in an amount of 10 to 500 ppm by weight, preferably 50 to 300 ppm by weight, based on the cyclic ether, the derived peroxide content of the cyclic ether must be 15 ppm by weight or less, preferably 5 ppm by weight or less, in terms of hydrogen peroxide. When the cyclic ether contains more than 15 ppm by weight of a derived peroxide, the acetal copolymer obtained has poor thermal stability because the acetal copolymer suffers oxidation decomposition due to the derived peroxide. As apparent from Comparative Example 4 described below, even when a sterically hindered phenol is added to a cyclic ether containing more than 15 ppm by weight of a derived peroxide, the thermal stability of the acetal copolymer produced cannot be improved.

As mentioned above, when a cyclic ether containing a derived peroxide in a large amount exceeding 15 ppm by weight is used for copolymerization with trioxane, the polymerization induction period is disadvantageously prolonged. In general, a copolymerization of trioxane with a cyclic ether is conducted using a twin-paddle type continuous mixer as a polymerization apparatus. When the polymerization induction period is so prolonged as to exceed the residence time of the mass in the mixer, a problem arises that an acetal copolymer still containing unreacted trioxane is discharged from the mixer. Further, the polymerization induction period also affects the stability of operation in the production of an acetal copolymer. Specifically, in the production of an acetal copolymer by copolymerization in the mixer, monomers in a liquid form undergoes a phase transition from a liquid to a solid through a viscous liquid. When the polymerization induction period is prolonged, the period of time during which monomers are in the form of a liquid and a viscous liquid is prolonged, so that the transportation of the mass in the reaction mixer becomes poor (as compared to the transportation of a solid polymer) and the driving part for the twin paddle suffers an overload, and hence, the operation of the mixer becomes unstable and continuous operation becomes difficult. Therefore, also from the viewpoint of assuring the stable operation in the production of an acetal copolymer, the amount of a derived peroxide in a cyclic ether employed needs to be suppressed.

Further, the method of the present invention is also advantageous in that even when the amount of comonomer inserted in the acetal copolymer is varied, stable copolymerization can be conducted. That is, when it is desired that an increased amount of the comonomer be inserted in the acetal copolymer, it can easily be done simply by increasing the ratio of the cyclic ether relative to the trioxane as long as the content of the derived peroxide in the cyclic ether is 15 ppm by weight or less. In this case, the polymerization induction period does not change, even when the amount of the cyclic ether is varied. On the other hand, when the content of the derived peroxide in the cyclic ether is larger than 15 ppm by weight, the polymerization induction period is markedly prolonged, depending on the increase in the amount of the cyclic ether, so that the polymerization operation becomes unstable for the reason mentioned above.

Examples of sterically hindered phenols to be used in the method of the present invention include those which are generally employed as an antioxidant and those which are generally employed as a scavenger for free radicals. Specific examples of sterically hindered phenols to be used in the present invention include 2,2-methylene-bis(4-methyl-6-t-butylphenol), hexamethylene glycol-bis(3,5-di-t-butyl-4-hydroxyhydrocinnamate), tetrakis[methylene(3,5-t-butyl-4-hydroxyhydrocinnamate)]methane, triethylene glycol-bis-3-(3-t-butyl-4-hydroxy-5-methylphenyl)propionate, 1,3,5-trimethyl-2,4,6-tris(3,5-di-t-butyl-4-hydroxybenzyl) benzene, 4,4-methylenebis(2,6-di-t-butylphenol), octadecyl-3-(3,5-di-t-butyl-4-hydroxyphenyl)propionate, di-stearyl-3,5-di-t-butyl-4-hydroxybenzylphosphonate, and 2-t-butyl-6-(3-t-butyl-5-methyl-2-hydroxybenzyl)-4-methylphenylacrylate.

Of these, from the viewpoint of ease in operation, preferred is a sterically hindered phenol which is soluble in the below-mentioned cyclic formal and, accordingly, tetrakis [methylene(3,5-di-t-butyl-4-hydroxyhydrocinnamate)] methane (Irganox 1010 manufactured and sold by CIBA-GEIGY, Switzerland) is especially preferred.

The cyclic ether to be used in the method of the present invention can be represented by the formula (I):

wherein each of $R^1$ to $R^4$ independently represents a hydrogen atom, a $C_1$–$C_5$ alkyl group which is unsubstituted or substituted with 1 to 3 halogen atoms, and each $R^5$ independently represents a methylene or oxymethylene group, which is unsubstituted or substituted with 1 or 2 $C_1$–$C_5$ alkyl groups or 1 or 2 halogen atoms (in this case, p represents an integer of from 0 to 3), or each $R^5$ independently represents a bivalent group represented by formula (II) or (III):

[in this case, p in formula (I) is 1, and q in formula (II) or (III) represents an integer of from 1 to 4].

Representative examples of cyclic ethers represented by formula (I) above include ethylene oxide, propylene oxide, 1,3-dioxolane, 1,4-butanediol formal, epichlorohydrin and diglycol formal. Of these, a cyclic formal, such as 1,3-dioxolane or 1,4-butanediol formal, is especially preferred. In the present invention, the cyclic ether as a comonomer is used in an amount of from 0.05 to 15 mol %, preferably from 0.1 to 10 mol %, based on the weight of the trioxane.

The number of carbon atoms in the cyclic ether is not particularly limited. However, from the viewpoint of ease in synthesis and purification of a cyclic ether, it is preferred that the cyclic ether have 2 to 10 carbon atoms.

Examples of cation-active catalysts to be used in the present invention include Lewis acids, such as boron trifluoride, boron trifluoride dibutyl ether, tin tetrachloride, titanium tetrachloride, phosphorus pentafluoride and phosphorus pentachloride, and complexes and salts thereof; and perfluorosulfonic acids and derivatives thereof, such as trifluoromethanesulfonic acid and trifluoromethanesulfonic acid anhydride. Of the above cation-active catalysts, boron trifluoride, complexes thereof, and trifluoromethanesulfonic acid and derivatives thereof are preferred. With respect to the amount of the cation-active catalyst, when the catalyst is boron trifluoride or a complex thereof, the catalyst is used in an amount of from $5\times10^{-6}$ to $8\times10^{-5}$ mol, preferably $0.5\times 10^{-5}$ to $6\times10^{-5}$ mol per mol of the total of the trioxane and cyclic ether. On the other hand, when the catalyst is trifluoromethanesulfonic acid or a derivative thereof, the catalyst is used in an amount of from $1\times10^{-8}$ to $5\times10^{-7}$ mol, preferably $5\times10^{-8}$ to $3\times10^{-7}$ mol per mol of the total of the trioxane and cyclic ether.

When boron trifluoride or a complex thereof is used, as the cation-active catalyst, in an amount exceeding $8\times10^{-5}$ mol per mol of the total of the trioxane and cyclic ether, or when trifluoromethanesulfonic acid or a derivative thereof is used, as the cation-active catalyst, in an amount exceeding $5\times10^{-7}$ mol per mol of the total of the trioxane and cyclic ether, a hydride shift reaction (see, for example, H. D. Herman, E. Fisher, K. Weissermel, Macromol Chem., 90, p. 1, 1966) is likely to occur as a side reaction during the copolymerization, so that the amount of the terminal methoxyl or formate groups formed is increased, leading to a difficulty in producing an acetal copolymer having a high molecular weight. When the hydride shift reaction markedly occurs during the copolymerization, it becomes difficult to adjust the MI (melt index) of the acetal copolymer to a desired level even by adding a molecular weight modifier. For stable operation of the copolymerization, it is preferred that the ratio of the terminal formate groups in the acetal copolymer (which ratio is an index of the occurrence of the hydride shift reaction) be such that in the infrared absorption spectrum of the acetal copolymer, an absorbance $D_{1470}$ ascribed to the oxymethylene groups at the wave number of 1470 cm$^{-1}$ and an absorbance $D_{1710}$ ascribed to the terminal formate groups at the wave number of 1710 cm$^{-1}$ satisfy the relationship defined by the formula $D_{1470}/D_{1710} \geq 40$.

In the method of the present invention, the copolymerization reaction can be performed, for example, by bulk polymerization. The bulk polymerization may be conducted in either a batchwise or a continuous manner. In general, such a bulk polymerization is conducted using monomers in a molten form, to thereby produce a solid polymer in bulk form with the progress of the polymerization. With respect to the polymerization apparatus to be used in the method of the present invention, for a batchwise polymerization, a conventional reaction vessel equipped with a stirrer can be used, whereas, for a continuous polymerization, a cokneader, a twin-screw continuous extrusion kneader or a twin-paddle type continuous mixer can be used. The polymerization apparatus may be used singly or in combination of two or more thereof.

In the method for producing an acetal copolymer according to the present invention, trioxane, a cyclic ether and a cation-active catalyst can be supplied to a polymerization apparatus in either of the following two different manners, namely, in a manner in which respective whole amounts of all components are simultaneously supplied to the polymerization apparatus at one raw material inlet thereof and in an alternative manner in which trioxane, a cyclic ether and a cation-active catalyst are supplied to the polymerization apparatus in a divided fashion.

When trioxane, a cyclic ether and a cation-active catalyst are supplied to a polymerization apparatus in a divided manner, the insertion distribution of the comonomer units in the resultant acetal copolymer becomes non-uniform, differing from that in the conventional acetal copolymer, so that the acetal copolymer can be improved in mechanical properties and the like.

In supplying trioxane, a cyclic ether and a cation-active catalyst to a polymerization apparatus in a divided manner, first, a copolymerization of trioxane with a cyclic ether is conducted in the presence of a cation-active catalyst for 30 seconds to 10 minutes to thereby obtain a reaction mixture, and, subsequently, at least one member selected from the group consisting of trioxane, a cyclic ether and a cation-active catalyst is added to the reaction mixture which has been obtained in the preceding step and in which the cation-active catalyst used in the preceding step is not deactivated, to thereby conduct a further copolymerization reaction. In practicing such a method, a continuous type of polymerization apparatus is used which has at least two raw material inlets, in which a first inlet is located at an end portion opposite to the location of a product outlet, and a second, a third . . . inlet/inlets are arranged along a length of the polymerization apparatus from one end portion at which the first inlet is located to the other end portion at which the product outlet is located. In such a continuous polymerization apparatus, trioxane, a cyclic ether and a cation-active catalyst are first supplied to the apparatus at the first inlet thereof and, subsequently, at least one member selected from trioxane, a cyclic ether and a cation-active catalyst is supplied to the apparatus at the second, the third . . . inlet/inlets to conduct a further copolymerization reaction.

Thus, according to a preferred embodiment of the present invention, there is provided a method for producing an acetal copolymer, which comprises copolymerizing trioxane with a cyclic ether in the presence of a cation-active catalyst, wherein the copolymerization of the trioxane with the cyclic ether is conducted in a sequence of the following steps (A) and (B):

(A) performing a copolymerization reaction of the trioxane with the cyclic ether in the presence of the cation-active catalyst for 30 seconds to 10 minutes to thereby obtain a reaction mixture; and (B) adding at least one member selected from the group consisting of trioxane, a cyclic ether and a cation-active catalyst to the reaction mixture which has been obtained in the preceding step and in which the cation-active catalyst used in the preceding step is not deactivated, to thereby conduct a further copolymerization reaction, wherein the step (B) is performed at least once.

In the method of the present invention, the polymerization can be conducted at 60° to 200° C., preferably 60° to 140° C., under atmospheric pressure. With respect to the polymerization time [which is defined as a time from the initiation of the polymerization (which is caused to occur by adding a cation-active catalyst to monomers including trioxane and a cyclic ether) to the deactivation of the cation-active catalyst in the resultant acetal copolymer], it is varied depending on the amount of the polymerization catalyst, and there is no particular limitation thereon. However, in general, the polymerization time is preferably in the range of from 15 seconds to 50 minutes.

In the method of the present invention, generally, the catalyst remaining in the resultant copolymer is neutralized and deactivated by adding a catalyst deactivator to the resultant copolymer (in bulk form or powdery form) which is taken out from the outlet of the polymerization apparatus after the lapse of a predetermined period of time from the initiation of the polymerization, followed by mixing while heating, or by adding an aqueous solution of a catalyst deactivator to the copolymer. Removal of unreacted monomers is also done.

Examples of catalyst deactivators include ammonia, amines (such as triethylamine and tri-n-butylamine), hydroxides of alkaline metals and alkaline earth metals, and other known catalyst deactivators.

The above-mentioned removal of unreacted monomers is conducted as follows. When an aqueous solution of a catalyst deactivator (such as triethylamine) is added to the copolymer, the resultant mixture is subjected to filtration to thereby separate the copolymer from unreacted monomers. In this case, if the copolymer contained in the reaction mixture is in a large bulk form, it is preferred that the copolymer be pulverized prior to the removal of unreacted monomers. On the other hand, when a catalyst deactivator as such (in non-solution form) is added to the resultant copolymer, followed by mixing while heating, unreacted monomers are removed by evaporation by heating.

The thus obtained acetal copolymer has unstable terminals, and a part of the catalyst remaining therein is still not completely deactivated. Therefore, in order to obtain an ultimate stable acetal copolymer, the copolymer is subjected to melt-kneading with a basic substance (such as an amino compound) in an extruder, to thereby perform a post-treatment in which unstable terminals are changed to stable terminals and the undeactivated catalyst component is deactivated. However, when the acetal copolymer has unstable terminals in a relatively large amount, the unstable terminals are not sufficiently changed to stable terminals by the above-mentioned post-treatment using the extruder. Further, when the acetal copolymer is one which is still likely to suffer decomposition by the catalyst contained in the copolymer and by oxidation, the decomposition of the copolymer occurs in the extruder during the above-mentioned post-treatment to form further unstable terminals. Therefore, for obtaining a stable acetal copolymer as an ultimate product, it is desired that the acetal copolymer, which is to be subjected to the above-mentioned post-treatment, also should have high thermal stability (i.e., having less unstable terminals, and suffering less decomposition by the catalyst and oxidation). This has been successfully achieved for the first time by the method of the present invention.

With respect to the above-mentioned post-treatment of the unstable terminals, explanation is made below in detail. In the present invention, the acetal copolymer chains collectively have, as terminal groups, alkoxyl groups (such as methoxyl group), hydroxyalkyl groups (such as hydroxyethyl group) and formate groups (—OOCH).

The terminal alkoxyl groups are derived from a formal which is used as a molecular weight modifier in the copolymerization. For example, methylal [$(CH_3O)_2CH_2$] is generally used as a molecular weight modifier. In this case, methoxyl groups are formed as terminal groups.

The terminal formate groups are formed by a hydride shift reaction which occurs as a side reaction during the copolymerization, as mentioned above.

The terminal hydroxyalkyl groups, such as hydroxyethyl group (—$CH_2CH_2OH$) and hydroxybutyl group, are derived from a cyclic ether which is a comonomer of the acetal copolymer. The terminal hydroxyalkyl groups are formed as follows. That is, during the production of an acetal copolymer comprising recurring oxymethylene monomer units and oxyalkylene monomer units (which are derived from a cyclic ether) inserted therein, hydroxymethyl groups (which are unstable under heated conditions) are inevitably formed as terminal groups due to the presence of a small amount of water in raw materials for producing the acetal copolymer. When the produced acetal copolymer having unstable terminal hydroxymethyl groups is subjected to a post-treatment, for example, heat treatment in an aqueous solution of an alkaline substance (such as triethylamine), the unstable terminals (having terminal hydroxymethyl groups) of the copolymer chains are decomposed. This decomposition of the terminals of the copolymer chains proceeds toward the inner portion of the main chain of the copolymer comprising oxymethylene monomer units and oxyalkylene monomer units, and the decomposition terminates at a site where an oxyalkylene monomer unit is located, so that the oxyalkylene monomer unit at such a site is changed to a stable terminal hydroxyalkyl group, such as hydroxyethyl group, hydroxybutyl group or the like. Thus, a stable acetal copolymer as an ultimate product can be obtained.

For obtaining an ultimate, stable acetal copolymer by stabilizing terminals of an acetal copolymer as described above, it is preferred that an acetal copolymer obtained by the method of the present invention have an unstable terminal content of 3000 ppm by weight or less. When an acetal copolymer obtained by the method of the present invention has an unstable terminal content of more than 3000 ppm by weight or less, it is difficult to obtain a stabilized copolymer by a customary method for stabilizing terminals of an acetal copolymer. Unstable terminals of an acetal copolymer are formed, during the polymerization, due to impurities (such as water, methanol and formic acid) which have active hydrogen (hydrogen of OH), which impurities are contained in raw materials, such as trioxane and a cyclic ether. Therefore, it is desired that the amount of these impurities be reduced to a level as low as possible by distillation, adsorption or the like.

Examples of methods for reducing the amount of active hydrogen-containing compounds by distillation include a method in which trioxane or a cyclic ether is subjected to distillation in the presence of benzene, thereby causing the benzene and active hydrogen-containing compounds to be azeotropically distilled off. Examples of methods for reducing the amount of active hydrogen-containing compounds by adsorption include a method in which trioxane or a cyclic ether is passed through a column having packed therein an adsorbent, such as zeolite, thereby adsorbing the active hydrogen-containing compounds on the adsorbent.

For producing an acetal copolymer having an unstable terminal content of 3000 ppm by weight or less, it is desired that the total of active hydrogen (hydrogen of OH) in the impurities be 20 ppm by weight or less in terms of the amount of $H_2O$, based on the weight of the trioxane.

In the most preferred embodiment of the method of the present invention:

(1) the total active hydrogen in the impurities contained in the trioxane and cyclic ether employed is 20 ppm by weight or less in terms of the amount of $H_2O$, based on the weight of the trioxane;

(2) boron trifluoride dibutyl ether is used, as a polymerization catalyst, in an amount of $5\times10^{-6}$ to $8\times10^{-5}$ mol per mol of the total of the trioxane and cyclic ether, or trifluoromethanesulfonic acid is used, as a polymerization catalyst, in an amount of $1\times10^{-8}$ to $5\times10^{-7}$ mol per mol of the total of the trioxane and cyclic ether;

(3) tetrakis [methylene (3,5-di-t-butyl-4-hydroxyhydrocinnamate)] methane is added, as a sterically hindered phenol, to 1,3-dioxolane or 1,4-butanediol formal as a cyclic ether, in an amount of 10 to 500 ppm by weight; and (4) the cyclic ether employed contains a peroxide derived therefrom in an amount of 15 ppm by weight or less in terms of hydrogen peroxide.

BEST MODE FOR CARRYING OUT THE INVENTION

Hereinbelow, the present invention will be described in more detail with reference to the following Examples and Comparative Examples, but they should not be construed as limiting the scope of the present invention.

In the Examples and Comparative Examples, various measurements were conducted by the following methods to determine the following characteristics.

(1) %:

Unless otherwise specified, all percentage values are by weight.

(2) Method for determining the content of a derived peroxide in a cyclic ether (in terms of hydrogen peroxide):

40 ml of isopropyl alcohol, 10 ml of a saturated sodium iodide solution (a solution of NaI in isopropyl alcohol), 2 ml of acetate, and 25 g of a cyclic ether are mixed in a flask, and the resultant mixture is heated under reflux at 100° C. for about 5 minutes. Immediately after completion of the reflux, the mixture in the flask is subjected to titration, using a 0.01N thiosulfate soda. Specifically, the 0.01N thiosulfate soda is added until the color of the mixture in the flask is changed from yellow to colorlessness [the amount (ml) of the thiosulfate soda which has been added to the mixture in the flask is represented by A]. Further, as a blank titration, titration is conducted in substantially the same manner as mentioned above, except that no cyclic ether is used [the total amount (ml) of the thiosulfate soda which has been added to the mixture in the flask in the blank titration is represented by B].

The amount of a derived peroxide in the cyclic ether in terms of hydrogen peroxide is obtained by the following formula:

Amount of a derived peroxide (ppm in terms of hydrogen peroxide)

$$= \frac{(A - B) \times 17 \times 0.01}{25 \times 1000} \times 10^6$$

(3) Thermal stability [RV (retention of weight of polymer under heating in vacuo)] of an acetal copolymer:

Immediately after completion of the copolymerization reaction for producing an acetal copolymer, the content of the kneader employed for the copolymerization is added to an aqueous 0.1% tributylamine solution, and the resultant mixture is agitated at room temperature for 40 minutes, to thereby deactivate the catalyst. The resultant slurry is subjected to filtration, to thereby obtain an acetal copolymer as a sample. The obtained sample is dried in vacuo at 120° C. for 180 minutes. Then, 250 mg of the sample is placed in a test tube and kept in an oil bath at a temperature of 222° C. under a pressure of 750 mmHg for 50 minutes. After that period of time, the amount of the sample which remains in the test tube is measured. The RV of the acetal copolymer is defined by the formula:

$$RV(\%) = \frac{\text{the amount (mg) of the sample which remains in the test tube}}{250 \text{ mg}} \times 100$$

The closer to 100 (%) the above-mentioned RV value, the higher the thermal stability of the acetal copolymer.

(4) Thermal stability (RV) of an ultimate acetal copolymer:

The same procedure as in the measurement of the RV of an acetal copolymer described in item (3) above is conducted, except that an ultimate acetal copolymer is used which is obtained by subjecting an acetal copolymer produced by the method of the present invention to a post-treatment for stabilizing terminals thereof.

(5) Polymerization induction period:

When a mixture of trioxane and a cyclic ether is mixed with a polymerization catalyst for copolymerizing the trioxane with the cyclic ether, the liquid monomers undergo a phase transition to a solid through a viscous liquid. The "polymerization induction period" used herein means a period of time from the addition of the catalyst to the formation of a solid polymer. In general, when a polymerization induction period is 10 to 200 seconds, the polymerization reaction can be stably conducted on a commercial scale even by means of a twin-paddle type continuous mixer.

(6) Unstable terminal content of an acetal copolymer:

An acetal copolymer is kept at 180° C. under flowing nitrogen gas for 50 minutes while allowing formaldehyde generated from the acetal copolymer to be absorbed in water, and the formaldehyde content of the water is measured. The amount of unstable terminals is determined, based on the formaldehyde content of the water. Under the above-mentioned conditions, only the unstable terminals of an acetal copolymer are decomposed to form formaldehyde.

(7) Ratio of terminal formate groups ($D_{1470}/D_{1710}$) (an index of a hydride shift reaction):

An acetal copolymer is hot pressed at 200° C. to thereby obtain a film having a thickness of 15 μm. An infrared absorption spectrum of the film is obtained. From the infrared absorption spectrum, the ratio of an absorbance at the wave number of 1470 $cm^{-1}$ to an absorbance at the wave number of 1710 $cm^{-1}$, i.e., $D_{1470}/D_{1710}$ ratio is calculated. The $D_{1470}/D1710$ ratio is an index of a hydride shift reaction, which is a side reaction accompanying the polymerization reaction.

(8) MI (melt index) of an acetal copolymer:

The MI used herein means a melt index (g/10 min) as measured at 190° C. in accordance with ASTM D1238, and is evaluated as a characteristic value corresponding to a molecular weight. The lower the MI, the higher the molecular weight.

EXAMPLE 1

1,3-dioxolane was synthesized from ethylene glycol, 40% formalin and sulfuric acid, and then purified by distillation. 100 kg of the obtained 1,3-dioxolane (water content: 10 ppm by weight; derived peroxide content: 0.5 ppm by weight) was mixed with tetrakis [methylene (3,5-di-t-butyl-4-hydroxyhydrocinnamate)] methane (Irganox 1010 manufactured and sold by CIBA-GEIGY, Switzerland) so that the final concentration of the tetrakis [methylene (3,5-di-t-butyl-4-hydroxyhydrocinnamate)] methane became 100 ppm by weight. The resultant mixture was placed in a tank made of stainless steel (JIS SUS304) and kept at 30° C. in a nitrogen atmosphere for 30 days. After that period of time, the derived peroxide content of the 1,3-dioxolane was 0.6 ppm by weight. A copolymerization reaction was conducted, using this 1,3-dioxolane having a derived peroxide content of 0.6 ppm by weight, as follows.

A 5-liter kneader having 2 agitating blades and a jacket capable of circulating a heating medium was used. The internal temperature of the kneader was elevated to 80° C. under atmospheric pressure, and 2 kg of trioxane (water content: 1 ppm by weight; formic acid content: 1 ppm by weight; methanol content: 3 ppm by weight), 1.41 ml of methylal as a molecular weight modifier, and 75 g of the above-mentioned 1,3-dioxolane having a derived peroxide content of 0.6 ppm by weight (water content: 20 ppm by weight) as a comonomer were charged into the kneader, and a (0.2%) cyclohexane solution of boron trifluoride dibutyl ether was immediately added in an amount such that the final concentration of boron trifluoride dibutyl ether became $1.5\times10^{-5}$ mol per mol of the total of the trioxane and 1,3-dioxolane, and a polymerization reaction was conducted. 20 minutes after the start of the reaction, 2 liters of an aqueous 0.1% tributylamine solution was added to thereby deactivate the catalyst and terminate the reaction. The obtained reaction mixture was further agitated at 80° C. for 1 hour. Then, the content of the kneader was taken out and subjected to filtration, thereby obtaining an acetal copolymer. The obtained acetal copolymer was dried at 100° C.

The obtained acetal copolymer exhibited an RV of 99.6%, indicating that it had a good thermal stability. The polymerization yield was 91% and the polymerization induction period was 30 seconds, indicating that the polymerization reaction was stable.

The obtained acetal copolymer also exhibited a ratio $D_{1470}/D_{1710}$ of 45 and an MI of 9.1 g/10 min, and had an unstable terminal content of 1500 ppm by weight.

100 parts by weight of the acetal copolymer was mixed with 6 parts by weight of an aqueous triethylamine solution (composed of 1 part by weight of triethylamine and 5 parts by weight of water) and 0.2 part by weight of 2,2-methylene-bis-(4-methyl-6-t-butylphenol) and the resultant mixture was subjected to extrusion, using a vented, single-screw extruder (residence time: 300 seconds), to thereby change unstable molecular terminals to stable terminals, thereby obtaining an ultimate acetal copolymer (extrusion temperature: 200° C.; vent pressure: 200 torr). The obtained ultimate acetal copolymer exhibited an RV of 99.9%, indicating that it had an excellent thermal stability.

Results are shown in Table 1.

EXAMPLES 2 TO 4

Substantially the same procedure as in Example 1 was repeated, except that as cyclic ethers and sterically hindered phenols, those which are shown in Table 1 were employed. In Example 4, 1,4-butanediol formal used as a cyclic ether was synthesized using butanediol instead of the ethylene glycol used in Example 1. Results are shown in Table 1.

EXAMPLE 5

Substantially the same procedure as in Example 1 was repeated, except that the amount of 1,3-dioxolane having a derived peroxide content of 0.6 ppm by weight was changed to 150 g. Results are shown in Table 1.

In this Example, even if the amount of 1,3-dioxolane relative to the trioxane was increased without changing the amount of boron trifluoride butyl ether, the polymerization induction period was 35 seconds, and the polymerization yield was 89%. The resultant acetal copolymer exhibited an MI of 9.0 g/10 min, an RV of 99.8% and a $D_{1470}/D_{1710}$ ratio of 40, and had an unstable terminal content of 1200 ppm by weight. The ultimate acetal copolymer exhibited an RV of 99.9%.

EXAMPLES 6 AND 7

Use was made of a twin-paddle type mixer having two raw material inlets (with respect to such a mixer, reference can be made to, for example, FIGS. 1, 2(A) and 2(B) of Examined Japanese Patent Application Publication No. 62-13973 except for the number and location of raw material inlets). Illustratively stated, use was made of a twin-paddle type mixer having a jacket and having, in a casing thereof, a pair of parallel shafts which can rotate in the same direction. Each of the shafts has a number of paddles (each having a convex lens-like cross-section) connected thereto. Paddles of one shaft and paddles of the other shaft are arranged to form a plurality of paddle couples arranged along a length of the mixer, such that one paddle of each paddle couple is adapted to rotate so as to partially overlap with the other rotating paddle while keeping a slight clearance between both paddles partially overlapping and between each rotating paddle and an inner wall of the casing. In this mixer, the L/D ratio is 45 (wherein L is the length of the mixer, and D is the minor diameter of the cross-section of the inner space of the mixer). A product outlet of the mixer is located at one end portion of the length of the mixer. A first raw material inlet of the mixer is located at a position which is at a distance of 3 times the value of D from the other end of the mixer which is opposite to the portion at which the product outlet is located, and a second raw material inlet of the mixer is located at a position which is at a distance of 12 times the value of D from the other end of the mixer which is opposite to the portion at which product outlet is located.

In Examples 6 and 7, raw materials and polymerization temperature and pressure employed were the same as in Example 1. In Examples 6 and 7, a post-treatment for stabilizing terminals of an acetal copolymer was conducted in the same manner as in Example 1.

In Example 6, 2 kg/hr of trioxane, 75 g/hr of 1,3-dioxolane having a derived peroxide content of 0.6 ppm by weight, 1.14 ml/hr of methylal and boron trifluoride dibutyl ether were continuously fed into the twin-paddle type mixer from the first inlet so that the final concentration of the boron trifluoride dibutyl ether became $1.5\times10^{-5}$ mol per mol of the total of the trioxane and 1,3-dioxolane. The polymerization yield was 94%, and the obtained acetal copolymer exhibited an RV of 99.6%, an MI of 8.8 g/10 min and a $D_{1470}/D_{1710}$ ratio of 43, and had an unstable terminal content of 1500 ppm by weight. The polymerization induction period was 30 seconds, so that a continuous operation could be conducted without any problems, such as a clogging of an outlet of the mixer, poor transportation of a powdery reaction mixture and an overload of a driving part for the twin paddle. The ultimate acetal copolymer exhibited an RV of 99.9%, indicating that it had high thermal stability.

Results are shown in Table 1.

In Example 7, 2 kg/hr of trioxane, 75 g/hr of 1,3-dioxolane having a derived peroxide content of 0.6 ppm by weight, 1.14 ml/hr of methylal and boron trifluoride dibutyl ether were continuously fed into the twin-paddle type mixer from the first inlet so that the final concentration of the boron trifluoride dibutyl ether became $1.2\times10^{-5}$ mol per mol of the total of the trioxane and 1,3-dioxolane and, from the second inlet, boron trifluoride dibutyl ether was continuously fed into the mixer so that the final concentration of the boron trifluoride dibutyl ether became $0.3\times10^{-5}$ mol per mol of the total of the trioxane and 1,3-dioxolane. The polymerization yield was 92%, and the obtained acetal copolymer exhibited an RV of 99.6%, an MI of 7.0 g/10 min and a $D_{1470}/D_{1710}$ ratio of 42, and had an unstable terminal content of 2000 ppm by weight. A continuous operation could be conducted without any problems, such as a clogging of an outlet of the mixer, a poor transportation of a powdery reaction mixture and an overload of a driving part for the twin paddle. The ultimate acetal copolymer exhibited an RV of 99.9%, indicating that it had a high thermal stability.

Results are shown in Table 1.

Comparative Examples 1 and 2

Substantially the same procedure as in Example 1 was repeated, except that the amount of the sterically hindered phenol was changed as shown in Table 2.

Results are shown in Table 2. In Comparative Example 1, since the amount of the sterically hindered phenol was less than 10 ppm by weight, the derived peroxide content of 1,3-dioxolane which had been kept for 30 days was increased to 40 ppm by weight. The resultant acetal copolymer exhibited an RV of 97.1%. The polymerization induction period of the acetal copolymer was 600 seconds, indicating that the polymerization reaction was unstable. The ultimate acetal copolymer exhibited an RV of 98.3%, indicating that it had a poor thermal stability.

In Comparative Example 2, since the amount of the sterically hindered phenol was more than 500 ppm by weight, the activity of the polymerization catalyst was lowered, so that the polymerization yield was 65%.

Comparative Example 3

Substantially the same procedure as in Example 1 was repeated, except that 100 ppm by weight of triethylamine was used instead of the sterically hindered phenol. The derived peroxide content of the 1,3-dioxolane which had been kept for 30 days was 9 ppm by weight. The 1,3-dioxolane was copolymerized with trioxane in the same manner as in Example 1. Results are shown in Table 2. The polymerization catalyst was deactivated with triethylamine, so that an acetal copolymer was not obtained.

Comparative Example 4

1,3-dioxolane which had been synthesized and purified by distillation in the same manner as in Example 1 was kept for 30 days without adding a sterically hindered phenol. The derived peroxide content of the 1,3-dioxolane was 80 ppm by weight. 100 ppm by weight of Irganox 1010 was added to the 1,3-dioxolane, and the resultant mixture was subjected to copolymerization with trioxane in the same manner as in Example 1. Results are shown in Table 2. The obtained acetal copolymer exhibited an MI of 28.3 g/10 min, a $D_{1470}/D_{1710}$ ratio of 36, and had an unstable terminal content of 4200 ppm by weight, and the polymerization yield was 75%. The RV of the acetal copolymer was 96.5% and the polymerization induction period was 1200 seconds, indicating that the acetal copolymer had a poor thermal stability and that the polymerization reaction was unstable. The ultimate acetal copolymer exhibited an RV of 98.3%, indicating that it had poor thermal stability. As is apparent from this Comparative Example, a derived peroxide in a cyclic ether has a great influence on not only a thermal stability of an acetal copolymer to be produced but also on a copolymerization operation therefor, and that a sterically hindered phenol exhibits almost no effect when it is added to a cyclic ether in which a derived peroxide content has already been increased beyond the critical upper limit.

Comparative Example 5

Substantially the same procedure as in Example 6 was repeated, except that 1,3-dioxolane (which has a derived peroxide content of 80 ppm by weight) used in Comparative Example 4 was employed. Results are shown in Table 2.

The polymerization yield was 50%, and the obtained acetal copolymer exhibited an RV of 96.5%, an MI of 48.3 g/10 min and a $D_{1470}/D_{1710}$ ratio of 31, and had an unstable terminal content of 3900 ppm by weight. The polymerization induction period was 1200 seconds, so that the transportation of a powdery reaction mixture became poor, an outlet of the mixer was clogged by a reaction mixture, and the electric current in a driving part for the twin paddle was largely fluctuated and, hence, a continuous operation became difficult after 10 minutes from the start of the polymerization. The ultimate acetal copolymer exhibited an RV of 98.5%, indicating that it had a poor thermal stability.

Comparative Example 6

Substantially the same procedure as in Example 5 was repeated, except that 1,3-dioxolane (which has a derived peroxide content of 80 ppm by weight) used in Comparative Example 4 was employed. Results are shown in Table 2.

The polymerization yield was 45%, and the obtained acetal copolymer exhibited an MI of 56.5 g/10 min and a $D_{1470}/D_{1710}$ ratio of 30, and had an unstable terminal content of 4200 ppm. The RV of the acetal copolymer was 96.5%, indicating that the acetal copolymer had a poor thermal stability. When the amount of the 1,3-dioxolane having a derived peroxide content of 80 ppm by weight was increased, the polymerization induction period was largely prolonged to 2300 seconds, indicating that the polymerization reaction was unstable. The ultimate acetal copolymer exhibited an RV of 97.5%, indicating that it had a poor thermal stability.

TABLE 1

|  |  | Cyclic ether | type* | Amount of sterically hindered phenol added to the cyclic ether (ppm by weight) | Derived peroxide content of the cyclic ether after 30 days (ppm by weight) | RV of acetal copolymer (%) | Polymerization induction period (second) | Polymerization yield (%) | Ratio of terminal formate groups ($D_{1470}/D_{1710}$) | Melt index of acetal copolymer (g/10 min) | Unstable terminal content (ppm) | RV of ultimate acetal copolymer (%) |
|---|---|---|---|---|---|---|---|---|---|---|---|---|
| Examples | 1 | 1,3-dioxolane | A | 100 | 0.6 | 99.6 | 30 | 91 | 45 | 9.1 | 1500 | 99.9 |
|  | 2 | 1,3-dioxolane | A | 20 | 10 | 99.2 | 100 | 89 | 47 | 9.3 | 2200 | 99.8 |
|  | 3 | 1,3-dioxolane | A | 500 | 0.7 | 99.7 | 50 | 82 | 45 | 9.6 | 1800 | 99.9 |
|  | 4 | 1,4-butanediol formal | B | 100 | 0.7 | 99.6 | 40 | 90 | 48 | 9.5 | 1500 | 99.9 |
|  | 5 | 1,3-dioxolane | A | 100 | 0.6 | 99.8 | 35 | 89 | 40 | 9.0 | 1200 | 99.9 |
|  | 6 | 1,3-dioxolane | A | — | 0.6 | 99.6 | 30 | 94 | 43 | 8.8 | 1500 | 99.9 |
|  | 7 | 1,3-dioxolane | A | — | 0.6 | 99.6 | — | 92 | 42 | 7.0 | 1800 | 99.9 |

*) A: tetrakis[methylene(3,5-di-t-butyl-4-hydroxylhydrocinnamate)]methane
B: 2,2-methylenebis(4-methyl-6-t-butylphenol)

TABLE 2

| | | Sterically hindered phenol | | | | | | | | | |
|---|---|---|---|---|---|---|---|---|---|---|---|
| | Cyclic ether | type* | Amount of sterically hindered phenol added to the cyclic ether (ppm by weight) | Derived peroxide content of the cyclic ether after 30 days (ppm by weight) | RV of acetal copolymer (%) | Polymerization induction period (second) | Polymerization yield (%) | Ratio of terminal formate groups ($D_{1470}/D_{1710}$) | Melt index of acetal copolymer (g/10 min) | Unstable terminal content (ppm) | RV of ultimate acetal copolymer (%) |
| Comparative Examples 1 | 1,3-dioxolane | A | 5 | 40 | 97.1 | 600 | 70 | 42 | 25.1 | 6200 | 98.3 |
| 2 | 1,3-dioxolane | A | 800 | 0.7 | 99.7 | 300 | 65 | 40 | 22.2 | 3100 | 99.8 |
| 3 | 1,3-dioxolane | triethylamine | 100 | 9 | — | — | — | — | — | — | — |
| 4 | 1,3-dioxolane | — | — | 80 | 96.5 | 1200 | 75 | 36 | 28.3 | 4200 | 98.3 |
| 5 | 1,3-dioxolane | A | — | 80 | 96.5 | 1200 | 50 | 31 | 48.3 | 3900 | 98.5 |
| 6 | 1,3-dioxolane | A | 100 | 80 | 96.5 | 2300 | 45 | 30 | 57.5 | 4200 | 97.5 |

*) A; tetrakis[methylene(3,5-di-t-butyl-4-hydroxylhydrocinnamate)]methane
B; 2,2-methylenebis(4-methyl-6-t-butylphenol)

Industrial Applicability

By the method of the present invention, an acetal copolymer having high thermal stability can be stably obtained. Accordingly, the post-treatment of the acetal copolymer can be stably and efficiently conducted for deactivating the remaining catalyst and changing the unstable terminals to stable terminals, so that an ultimate acetal copolymer having high thermal stability can be stably obtained. Therefore, the industrial applicability of the method of the present invention is high.

We claim:

1. A method for producing an acetal copolymer, which comprises copolymerizing trioxane with 1,3-dioxolane or 1,4-butanediol formal in the presence of a cation-active catalyst, wherein said 1,3-dioxolane or 1,4-butanediol formal is obtained by adding to fresh 1,3-dioxolane or 1,4-butanediol formal containing a peroxide derived therefrom in an amount of 15 ppm by weight or less in terms of hydrogen peroxide at least one sterically hindered phenol in an amount of from 10 to 500 ppm by weight, based on the weight of said fresh 1,3-dioxolane or 1,4-butanediol formal.

2. The method according to claim 1, wherein said cation-active catalyst is boron trifluoride or a complex thereof, which is used in an amount of from $5 \times 10^{-6}$ to $8 \times 10^{-5}$ mol per mol of the total of said trioxane and said 1,3-dioxolane or 1,4-butanediol formal.

3. The method according to claim 1, wherein said cation-active catalyst is perfluorosulfonic acid or a derivative thereof, which is used in an amount of from $1 \times 10^{-8}$ to $5 \times 10^{-7}$ mol per mol of the total of said trioxane and said 1,3-dioxolane or 1,4-butanediol formal.

4. The method according to claim 1, wherein said acetal copolymer exhibits in the infrared absorption spectrum thereof an absorbance $D_{1470}$ ascribed to the oxymethylene groups at the wave number of 1470 cm$^{-1}$ and an absorbance $D_{1710}$ ascribed to the terminal formate groups at the wave number of 1710 cm$^{-1}$, said $D_{1470}$ and said $D_{1710}$ satisfying the relationship defined by the formula:

$$D_{1470}/D_{1710} \geq 40,$$

said acetal copolymer having an unstable terminal content of 3000 ppm by weight or less.

5. The method according to claim 1, wherein the copolymerization of said trioxane with said 1,3-dioxolane or 1,4-butanediol formal is conducted in a sequence of the following steps (A) and (B):

(A) performing a copolymerization reaction of said trioxane with said 1,3-dioxolane or 1,4 butanediol formal in the presence of said cation-active catalyst for 30 seconds to 10 minutes to thereby obtain a reaction mixture; and (B) adding at least one member selected from the group consisting of trioxane, 1,3-dioxolane or 1,4-butanediol formal and a cation-active catalyst to the reaction mixture which has been obtained in the preceding step and in which the cation-active catalyst used in the preceding step is not deactivated, to thereby conduct a further copolymerization reaction.

wherein said step (B) is performed at least once.

* * * * *

UNITED STATES PATENT AND TRADEMARK OFFICE
CERTIFICATE OF CORRECTION

PATENT NO. : 5,741,866

DATED : April 21, 1998

INVENTOR(S) : YAHIRO et al.

It is certified that error appears in the above-identified patent and that said Letters Patent is hereby corrected as shown below:

In Table 2, column 10, line 1 from the bottom, "57.5" should be changed to --56.5--.

Signed and Sealed this

Eleventh Day of May, 1999

Attest:

Q. TODD DICKINSON

*Attesting Officer*     *Acting Commissioner of Patents and Trademarks*